United States Patent [19]
Bradshaw et al.

[11] Patent Number: 5,592,388
[45] Date of Patent: Jan. 7, 1997

[54] METHOD OF AND APPARATUS FOR ANALYZING INTERNAL COMBUSTION ENGINE SPEED DATA

[75] Inventors: Benjamin J. Bradshaw; Michael Holmes, both of West Midlands; Russell W. Jones, Stratford-on-Avon, all of Great Britain

[73] Assignee: Lucas Industries Public Limited Company, West Midlands, England

[21] Appl. No.: 825,048

[22] Filed: Jan. 24, 1992

[30] Foreign Application Priority Data

Feb. 1, 1991 [GB] United Kingdom ............ 9102232

[51] Int. Cl.⁶ .................. G01M 15/00; G06F 17/00
[52] U.S. Cl. ................. 364/431.08; 73/117.3; 123/436
[58] Field of Search ............ 364/431.08, 431.01, 364/431.05, 424.05, 431.07; 123/436; 73/116, 117.1, 117.2, 117.3

[56] References Cited

U.S. PATENT DOCUMENTS

| | | | |
|---|---|---|---|
| 4,424,709 | 1/1984 | Meier, Jr. et al. | 73/117.3 |
| 4,509,484 | 4/1985 | Gertiser | 73/116 |
| 4,532,592 | 7/1985 | Citron et al. | 364/431.07 X |
| 4,697,561 | 10/1987 | Citron | 123/436 |
| 5,041,980 | 8/1991 | Maddock et al. | 364/431.07 X |
| 5,044,195 | 9/1991 | James et al. | 73/117.3 |
| 5,086,741 | 2/1992 | Nakamura et al. | 123/436 |
| 5,141,246 | 8/1992 | Nakaniwa | 364/424.05 X |
| 5,200,899 | 4/1993 | Ribbens et al. | 364/431.08 |
| 5,237,504 | 8/1993 | Holmes et al. | 123/436 |
| 5,311,773 | 5/1994 | Bradshaw et al. | 73/116 |

*Primary Examiner*—Emanuel T. Voeltz
*Assistant Examiner*—Edward Pipala
*Attorney, Agent, or Firm*—Nixon & Vanderhye P.C.

[57] ABSTRACT

Variations in the speed of an internal combustion engine are measured and the distribution of the variations is analyzed for asymmetry, which indicates engine misfire. A threshold is generated as a function of engine speed increases and compared with engine speed decreases to detect asymmetry in the distribution.

19 Claims, 6 Drawing Sheets

FIG 11

METHOD OF AND APPARATUS FOR ANALYZING INTERNAL COMBUSTION ENGINE SPEED DATA

BACKGROUND OF THE INVENTION

1. Field of the Invention

The present invention relates to a method of and an apparatus for processing internal combustion engine speed data. Such a method and apparatus may be used, for instance, to detect engine misfire and indicate the degree of road surface roughness.

2. Discussion of Prior Art

A known technique for detecting misfire of an internal combustion engine measures engine crankshaft speed variations and compares the variations with one or more thresholds. For instance, a respective fixed threshold may be used for each of a plurality of engine speed ranges, for instance 512 revolutions per minute (RPM) wide. Thus, for the prevailing engine speed, each speed variation is compared with the respective threshold and, if the threshold is exceeded, this is taken to indicate an engine misfire.

Setting a value of each threshold involves a compromise between detecting excessive numbers of false misfires and failing to detect genuine misfires. Engine crankshaft speed is subject to speed variations caused by random noise, for instance as a vehicle driven by the engine moves over a rough road or other surface or caused by drive line vibration in a transmission connected to the engine. Also, because of manufacturing and other tolerances, different engines of the same design can exhibit different amplitudes of speed variations. Further, the aging effects of engines can alter the amplitude of speed variations. If the threshold were set too low, then all of these effects could result in excessive false detections of misfire i.e. detection of misfire when the engine did not misfire.

In order to avoid excessive false detection of misfire, the threshold must be set high enough so as to make detection substantially immune from these effects. However, if the threshold is set to too high a value, then this technique may fail to detect substantial numbers of engine misfires. Although, in theory, each engine could be tested by deliberately introducing a misfire and setting the or each threshold so as to provide an acceptable detection performance, this is impractical for commercial production of engines and, in any event, cannot take into account various of the effects described above, such as engine aging and road surface roughness.

SUMMARY OF THE INVENTION

According to a first aspect of the invention, there is provided a method of processing internal combustion engine speed data, comprising measuring variations in speed of the engine, analysing the distribution of engine speed variations, and taking a predetermined action dependent on the result of the analysis.

According to a second aspect of the invention, there is provided an apparatus for processing internal combustion engine speed data, comprising means for measuring variations in speed of the engine, means for analysing the distribution of engine speed variations, and means for taking a predetermined action dependent on the result of the analysis.

Preferably, the analysis of the distribution comprises analysing the degree of asymmetry of the distribution and the action taking step comprises signalling engine misfire if the degree of asymmetry exceeds a predetermined degree.

It has been found that engine misfire causes a detectable degree of asymmetry in the distribution of engine speed variations. In particular, the number and/or size of speed decreases exceeds the number and/or size of speed increases. The degree of asymmetry caused by engine misfire is substantially greater than any asymmetry resulting from other causes, and detection of such asymmetry therefore provides a relatively reliable measure of engine misfire.

The degree of asymmetry may be determined by generating a threshold as a function of speed increases and comparing the magnitude of speed decreases with the threshold. Preferably the threshold is made equal to the sum of a base threshold value and a function of the difference between speed increases exceeding the current threshold and the current threshold, which function decays with time.

The threshold may be used for all engine conditions, or there may be a plurality of thresholds corresponding to different engine conditions. The functions for the respective thresholds may be identical or may vary, for instance with regard to decay time constant.

Signalling of the engine misfire may be used to provide a visible or audible indication, for instance to a vehicle driver. Alternatively or additionally, the signalling may be used by an engine management system in order to attempt remedial action so as to reduce or eliminate misfire. Further, the numbers of misfires may be stored, possibly in association with other data relating to engine operation, for subsequent diagnosis of engine faults and performance.

The analysis may comprise determining a deviation, such as a standard deviation, of the distribution and the action taken may comprise signalling a degree of surface roughness dependent on the deviation. Thus, for internal combustion engines driving wheeled vehicles, it is possible to provide information about the surface roughness of the ground on which the vehicle is travelling.

It has been found that the width of the distribution of engine speed variations can be used to provide a measure of road surface roughness. For relatively smooth road surfaces, the distribution of speed variations is relatively narrow, whereas, for relatively rough surfaces, the distribution becomes substantially broader. The width of the distribution may be determined in order to provide a quantitative indication of the degree of surface roughness. Alternatively, the width of the distribution may be compared with one or more threshold levels in order to indicate whether the surface roughness is within any one of a plurality of roughness ranges.

The degree of surface roughness may be used for various purposes. For instance, this information may be supplied to an anti-lock brake system and/or to a traction control system in order to influence the operation thereof. The degree of surface roughness may be used, alone or with other parameters, to provide a measure of surface friction, and may therefore be used to influence a detection threshold for detecting wheel slip for anti-lock brake control and/or wheel spin for traction control.

Detection of engine misfire and detection of surface roughness may be performed independently of each other or may be performed within the same system. Engine management systems are generally based on micro-controller systems and co-operate with an engine crankshaft speed transducer. Such micro-controllers may be arranged to perform misfire detection and/or surface roughness detection without much or any hardware modification. Instead, the microcontroller controlling software may be augmented to provide these functions at little additional cost.

BRIEF DESCRIPTION OF THE DRAWINGS

The invention will be further described, by way of example, with reference to the accompanying drawings, in which.

DETAILED DISCUSSION OF PREFERRED EMBODIMENTS

Figure 1:
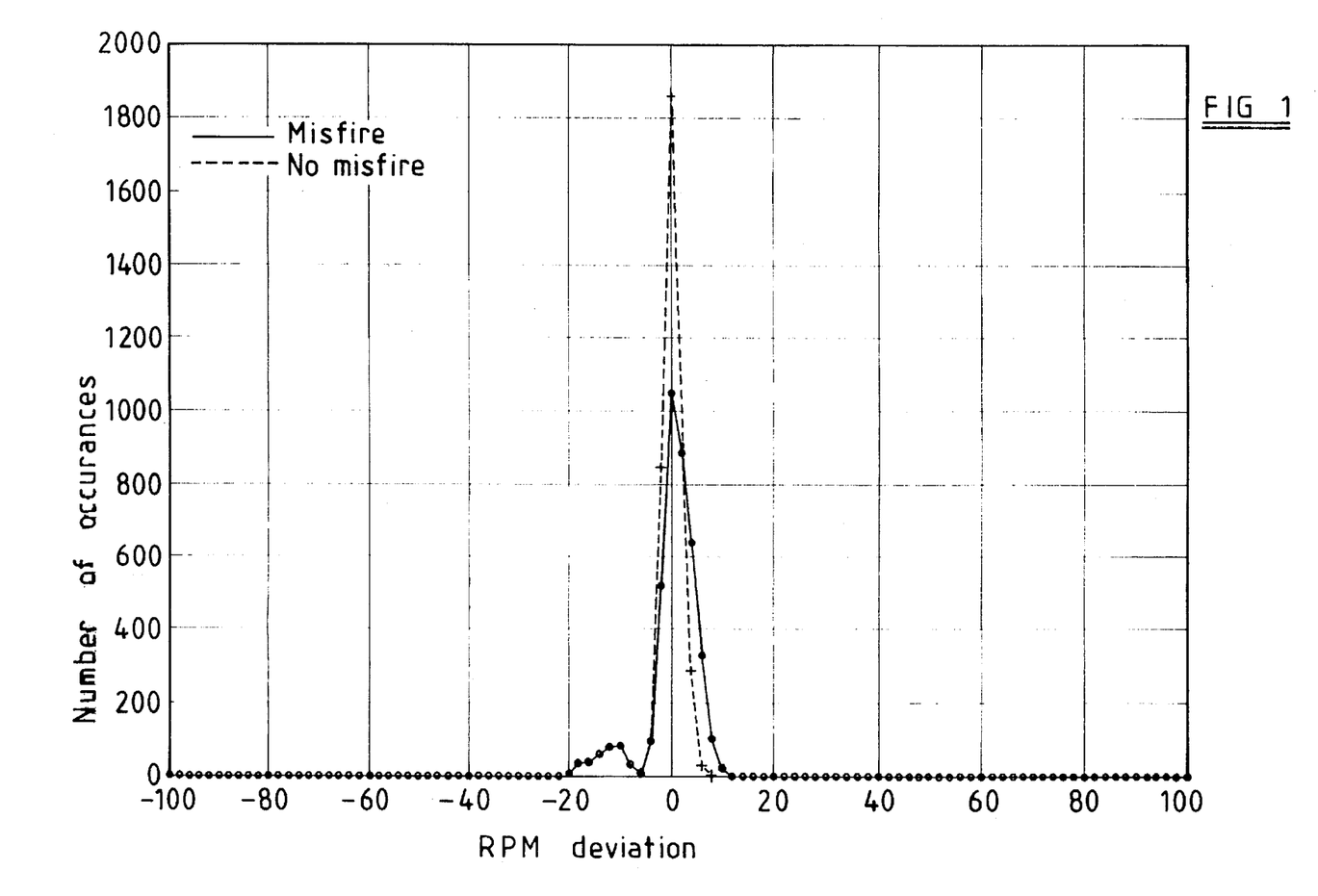
FIG. 1 is a graph illustrating distributions of engine speed variations.

The curve shown by the broken line in FIG. 1 represents the distribution of engine speed variations for an internal combustion engine during normal operation at a predetermined engine speed and in the absence of engine misfires, the measured numbers of occurrences of speed variations against the value of the speed variations being indicated by small crosses. The curve drawn in the solid line represents the distribution of engine speed variations for a deliberately introduced misfire occurring once in every thirty five firing cycles of the engine. The numbers of occurrences of measured speed variations are shown as small circles against the values of the speed deviations. In the absence of misfire, the distribution of speed variations is substantially symmetrical about the zero speed deviation mean. However, for a misfiring engine, the distribution becomes asymmetrical with the height of the zero deviation mean value being lower than for the no-misfiring distribution and with a "side lobe" appearing below the mean. Although not shown, it has further been found that the magnitude of deviations from the mean in each case provide an indication of the degree of surface roughness for a wheeled vehicle driven by an internal combustion engine.

Although it is possible to detect misfiring by measuring the height of the peak mean value, such measurements rely on relatively large numbers of speed variation measurements so that misfire detection based on such a technique would be relatively slow. Further, the height of this peak in the distribution is affected by the quality of the road surface. However, asymmetry can be detected relatively quickly by a technique which will be described hereinafter and thus provides a more useful and practical technique for detecting engine misfire. Furthermore, this technique is not substantially affected by road surface roughness.

Figure 2:
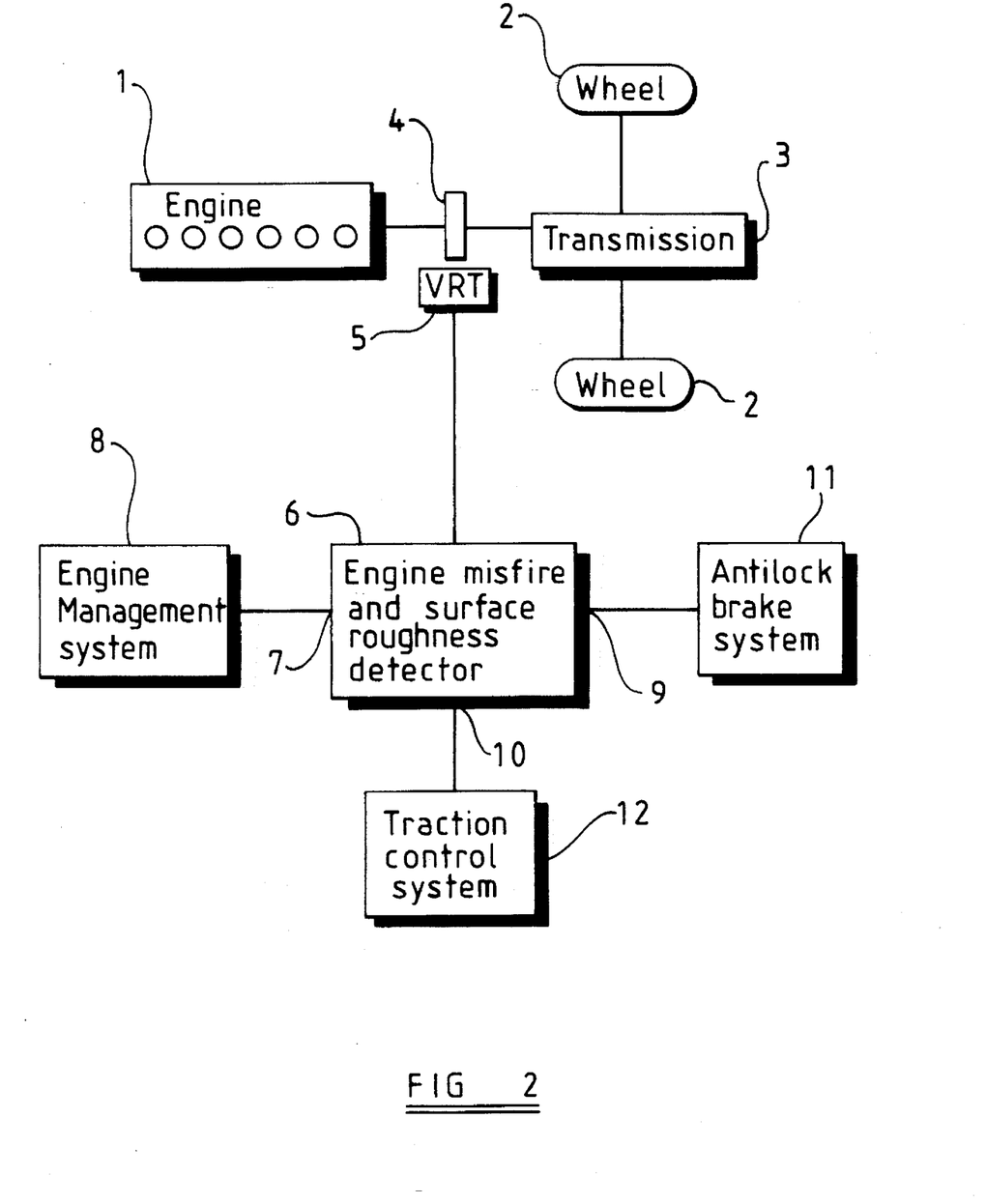
FIG. 2 is a block schematic diagram of an apparatus constituting an embodiment of the invention.

FIG. 2 shows diagrammatically an internal combustion engine 1 whose crankshaft drives road wheels 2 of a vehicle via a transmission 3. An engine crankshaft speed transducer comprises a measurement wheel 4, such as a toothed metal wheel, fixed to the engine crankshaft and a sensor 5, such as a variable reluctance transducer, co operating with the wheel 4. The output of the sensor 5 is connected to an input of an engine misfiring and surface roughness detector 6. Operation of the detector 6 will be described hereinafter.

The detector 6 provides misfire detection signals at an output 7 which is shown connected to an engine management system 8, although the detector 6 may be incorporated within the engine management system 8. The engine management system 8 is arranged to take predetermined action in response to misfire detections received from the detector 7, such as altering the engine operating point, providing an indication of misfire to a vehicle driver, and storing a record of misfire detections with corresponding engine operating parameters for subsequent diagnosis.

The detector 6 provides road surface roughness signals at outputs 9 and 10. The output 9 is connected to an anti-lock brake system 11 whereas the output 10 is connected to a traction control system 12. The anti-lock brake system 11 and/or the traction control system 12 may be embodied as part of an engine management system or vehicle system, or may be embodied separately. The anti-lock brake system 11 may, for instance, compare the speeds of the vehicle wheels with a reference speed so as to form wheel speed difference signals which are then compared with a wheel slip threshold value in order to perform anti-lock brake control. The slip threshold value may be influenced by the surface roughness signals supplied from the output 9 of the detector 6.

The traction control system 12 may compare the speeds of the driven wheels 2 with a reference speed value to form speed differences which are compared with a spin threshold value in order to detect wheel spin. The threshold value may be influenced by the signals received from the output 10 of the detector 6. The traction control system 12 controls traction when excess wheel spin is detected, for instance by altering engine output demand by means of the engine management system 8 and/or applying wheel brakes or differential locks within the transmission 3.

Figure 3:
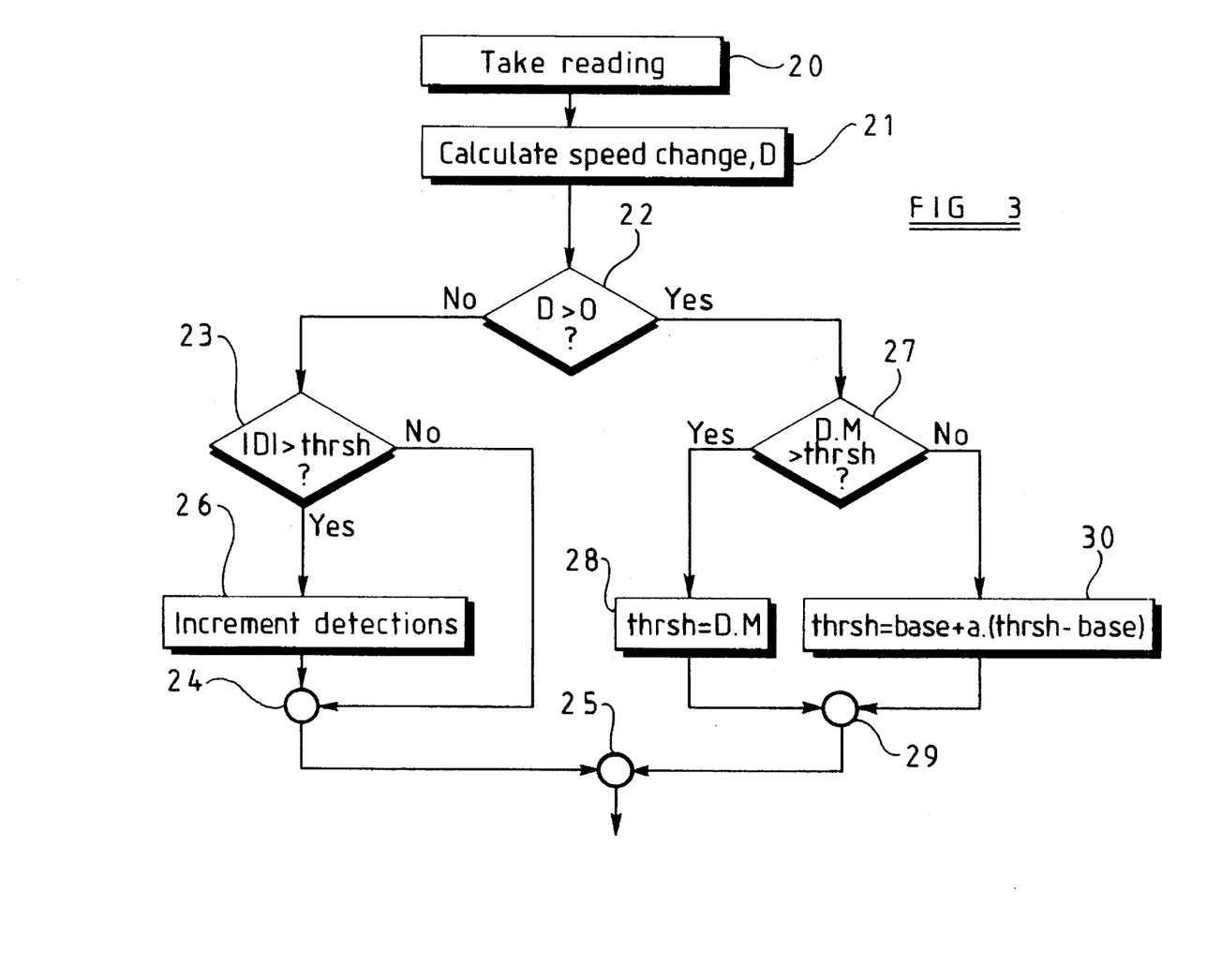
FIG. 3 is a flow diagram illustrating part of the operation of the apparatus of FIG. 2.

FIG. 3 illustrates engine misfire detection performed by the detector 6 of FIG. 2. At 20, the engine speed is read from signals supplied by the sensor 5 and at 21 the engine speed deviation or variation D is determined by subtracting the current speed reading from the engine speed reading obtained during a preceding cycle of operation. Alternatively the step 20 may perform any of the algorithms disclosed in European Patent Application No.0442687.

At 22, the engine speed deviation is compared with zero and, if it is less than or equal to zero, the modulus of the deviation is compared with a threshold at 23. If the modulus of the deviation is less than the threshold, control passes via 24 and 25 to the end of the detection routine and other functions are performed or control returns to the step 20 to await a subsequent reading of engine speed. If the modulus of the speed deviation exceeds the threshold, the number of misfire detections is incremented at 26 and control returns via 24 and 25.

If the speed deviation is greater than zero, the product of the speed deviation D and a constant M, for instance equal to 1.3, is formed and compared with the threshold at 27. If the product exceeds the threshold, the previous value of the threshold is replaced by the product D.M at 28 and control returns via 29 and 25, with the new value of the threshold being used for the succeeding cycle. If the product is less than the threshold at 27, the value of the threshold is caused to decay at 30 towards a base value. In particular, the threshold is set equal to the base value plus the product of a time constant a and the difference between the current threshold and the base value. For instance, the value of the constant a may be equal to 1023/1024. Control then passes via 29 and 25 and the reduced value of the threshold is used for the succeeding cycle of operation.

Figure 4:
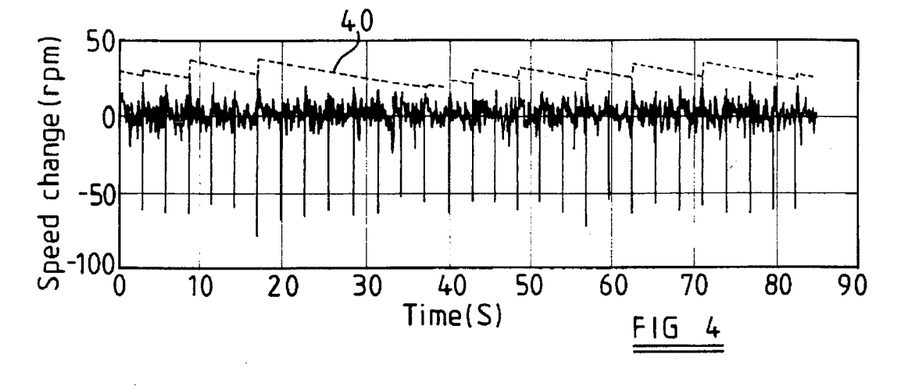
FIG. 4 is a graph illustrating a plot of engine speed changes with respect to time for a deliberately introduced engine misfire at a first engine speed.
Figure 5:
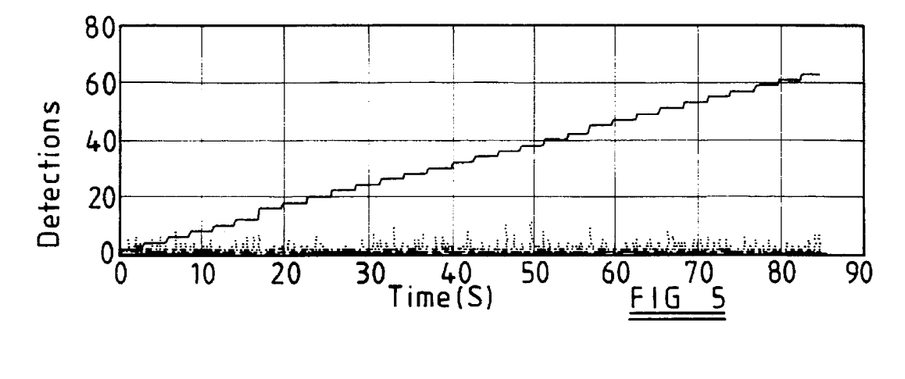
FIG. 5 illustrates the number of misfire detections provided by the apparatus of FIG. 2 for the deliberate misfire illustrated in FIG. 4.

Operation of the apparatus illustrated in FIGS. 2 and 3 is illustrated in the graphs 4 to 11 for different modes of engine operation. FIGS. 4 and 5 illustrate operation at an engine speed of 700 RPM for a 1% misfire i.e. a misfire occurring for one firing cycle in one hundred engine firing cycles.

FIG. 4 illustrates the determination of the threshold, as used in the method steps illustrated in FIG. 3, by means of a broken line 40. The threshold decays with time towards the base value until a positive speed deviation i.e. a speed increase, is measured such that the product of the increase and the constant M, which has a value of 1.3 in this embodiment, exceeds the existing value of the threshold. For each such speed increase, the threshold is set to the new value of the product of the speed increase and the constant M, and then begins to decay with time until the next such speed increase is measured. The threshold 40 thus provides a measure of maximum positive deviations of engine speed, and is compared with the negative engine speed deviations i.e. decreases, in order to detect engine misfires.

FIG. 5 illustrates the numbers of detections of engine misfires against the same time axis as in FIG. 4. Thus, every misfire of the engine during the test period was correctly detected and no false misfire detections were made.

Figure 6:
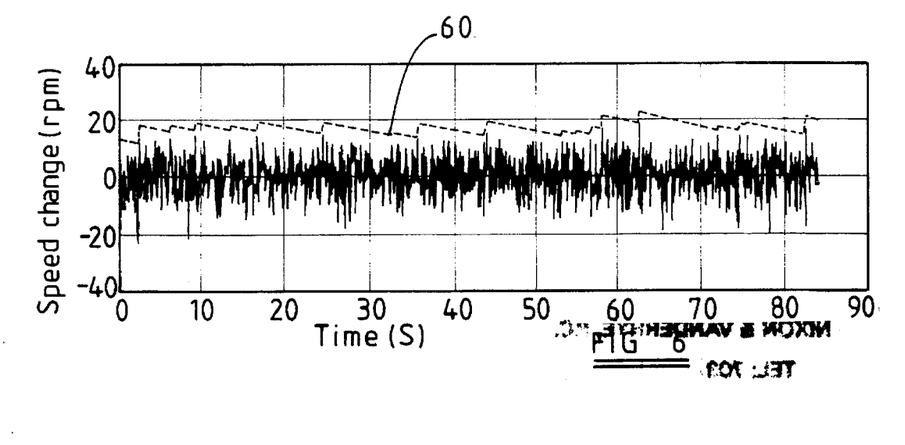
FIG. 6 is a graph corresponding to that of FIG. 4 without deliberate engine misfire.
Figure 7:
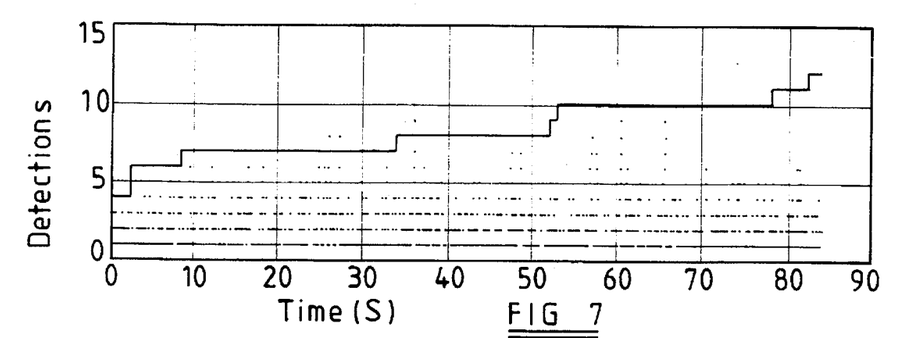
FIG. 7 is a graph similar to FIG. 5 for the conditions illustrated in FIG. 6.

FIGS. 6 and 7 correspond to FIGS. 4 and 5 but without any engine misfiring, the engine speed again being 700 RPM. The threshold is shown by the broken line 60 and the number of misfire detections i.e. the number of events where a negative speed deviation is greater than the threshold, is shown in FIG. 7. This represents false misfire detections and the number of such detections over a time period of one minute was 10. This rate of false misfire detection is acceptable and the rate of misfire detections can be compared against a predetermined rate in order to ignore relatively low rates corresponding to false misfire detections. Thus, by adapting the threshold to the positive values of the deviations, misfire can be detected with much greater reliability than for known systems using fixed thresholds.

Figure 8:
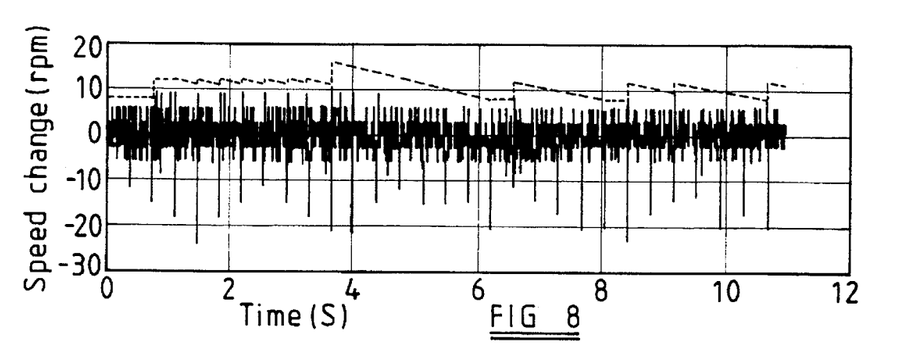
FIGS. 8 to 11 correspond to FIGS. 4 to 7, respectively, for a different engine speed.
Figure 9:
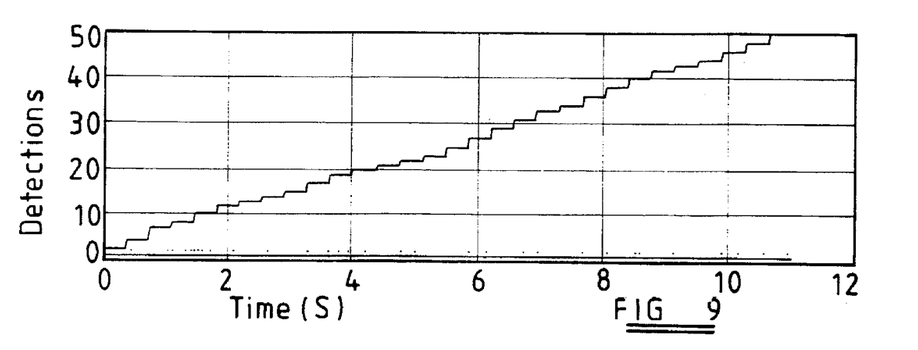
Figure 10:
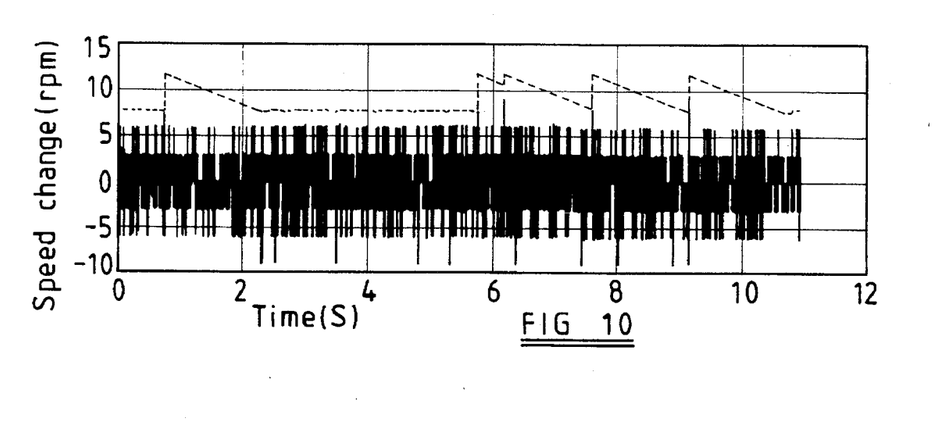
Figure 11:
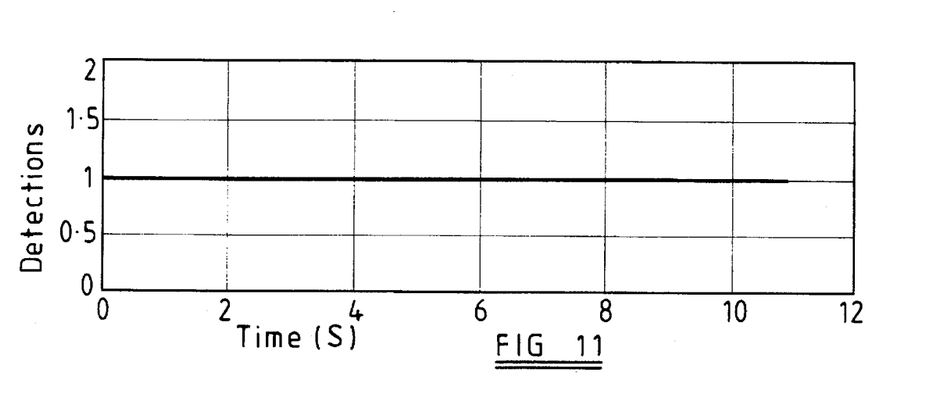

FIGS. 8 and 9 correspond to FIGS. 4 and 5, respectively, except that the method was performed at a substantially constant engine speed of 5500 RPM. Likewise, FIGS. 10 and 11 correspond to FIGS. 6 and 7, respectively, for an engine speed of 5500 RPM. As shown in FIG. 9, the engine misfires were reliably detected whereas, as shown in FIG. 11, false misfire detections were almost completely eliminated.

In order to provide a more reliable system, the engine speed range is preferably divided into a plurality of sub-ranges, each of which is 512 RPM wide and each of which has its own misfire detection threshold. In order to implement such a system, the operation illustrated in FIG. 3 is performed with a different threshold, and possibly with different values of the constants M and a, for each speed range, the values being selected in accordance with engine speed as measured by the sensor 5. In this case, the constant a would represent a time constant causing the threshold to decay towards the base value only when the engine speed was within the corresponding speed range. Alternatively, the step 30 could be performed in respect of all thresholds corresponding to all speed ranges whenever the step 30 is performed, thus providing an exponential decay which operates more uniformly against time. In another embodiment, the engine speed/engine load plane is divided into a plurality of regions addressed by engine speed and engine load and having different thresholds and possibly different constants M and a.

In a further modification, the misfire detection thresholds are allocated to respective, preferably evenly spaced, predetermined engine speeds and are derived as described in the preceding paragraph. However, to avoid possible discontinuities of thresholds between engine speed sub-ranges, the threshold for each actual engine speed is obtained by interpolation from the derived thresholds. For instance, the threshold at each actual engine speed is obtained by linear interpolation from the derived thresholds at the predetermined speeds immediately above and below the actual engine speed.

The operation of the apparatus 2 to detect engine misfire as illustrated in FIG. 3 thus provides reliable detection of actual engine misfire with very low levels of false misfire detection. This is achieved by means of a technique which rapidly detects asymmetry in the distribution of speed deviations of the internal combustion engine and is based on the discovery that such asymmetries exist for engine misfire and can provide reliable misfire detection.

Although not described in detail herein, the width of the distribution of engine speed deviations may also be used to determine surface roughness, for instance of the ground on which a vehicle is travelling. For instance, a negative threshold could be formed in the same way as the positive threshold is formed in the steps 27, 28, and 30 and the difference between the positive and negative thresholds could be used to, assess the surface roughness. Such steps for generating a negative threshold could be performed in place of the steps 23 and 26 of FIG. 3, with the step 25 being replaced by a subtracting step, or could be performed before or after the steps 23 and 26 with the step 25 again forming the difference between the positive and negative thresholds, so as to provide a system which simultaneously detected misfire and the degree of surface roughness.

As described above, knowledge of the surface roughness may be used by anti-lock brake and traction control systems to alter wheel slip and wheel spin thresholds. Although surface roughness may correspond in some circumstances to the co-efficient of friction of the surface, larger surface roughness can cause increased wheel accelerations and decelerations which might give false indications of wheel slip or wheel spin. Wheel slip or wheel spin thresholds may therefore be increased for relatively rough surfaces in order to provide greater immunity to false detection and actuation of anti-lock braking and traction control.

We claim:

1. A method of signalling an engine misfire by processing internal combustion engine speed data, said method comprising the steps of:

measuring variations in speed of said internal combustion engine, analyzing a distribution of said variations in speed measured in said measuring step to determine a degree of asymmetry of said distribution, and signalling an engine misfire if said degree of asymmetry exceeds a predetermined degree.

2. A method as claimed in claim 1, in which said analysing step further comprises generating a threshold as a first function of positive ones of said variations in speed measured in said measuring step and comparing magnitudes of negative ones of said variations in speed measured in said measuring step with said threshold.

3. A method as claimed in claim 3, in which said threshold is updated as a sum of a base threshold value and a second function of a difference between said threshold and said base threshold value, when said threshold is greater than a value obtained by applying said first function to a current positive one of said variations in engine speed.

4. A method as claimed in claim 3, in which said second function decays with time.

5. A method as claimed in claim 1, in which said signalling step comprises providing an indication of said engine misfire.

6. A method as claimed in claim 1, in which said signalling step comprises taking remedial action to reduce said engine misfire.

7. A method as claimed in claim 1, in which said signalling step comprises storing a record of said engine misfire.

8. An apparatus for signalling an engine misfire by processing internal combustion engine speed data, said apparatus comprising:

measuring means for measuring variations in speed of said internal combustion engine, analyzing means responsive to said measuring means for analyzing a distribution of said variations in speed to determine a degree of asymmetry thereof, and signalling means for signalling an engine misfire if said degree of asymmetry exceeds a predetermined degree.

9. An apparatus as claimed in claim 8, in which said analysing means comprises threshold generating means for generating a threshold as a first function of positive ones of said variations in speed and comparing means for comparing magnitudes of negative ones of said variations in speed with said threshold.

10. An apparatus as claimed in claim 9, in which said threshold generating means comprises: means for updating said threshold as a sum of said base threshold value and a second function as a difference between said threshold and said base threshold value, said updating means including means for updating said threshold when said threshold is greater than a value obtained by applying said first function to a current positive one of said variations in engine speed.

11. An apparatus as claimed in claim 8, in which said signalling means comprises means for storing an engine misfire record.

12. A method as claimed in claim 1 wherein said engine drives a vehicle over a surface, further comprising analyzing a deviation of said distribution and signalling an amount surtace roughness of of said surface dependent on said deviation.

13. A method of signalling a road surface roughness over which a vehicle containing an internal combustion engine is travelling by processing engine speed data, said method comprising the steps of:

measuring variations in speed of said internal combustion engine, analyzing a distribution of speed variations measured in said measuring step so as to determine a width of the distribution, and signalling a degree of surface roughness dependent on said distribution width.

14. A method as claimed in claim 13, in which said analyzing step comprises:

generating a first threshold as a first function of positive ones of said variations in speed measured in said measuring step;

generating a second threshold as a second function of negative ones of said variations in speed measured in said measuring step; and forming a difference between said first and second thresholds as a measure of deviation.

15. A method as claimed in claim 14, in which said first threshold is updated as a sum of a first base threshold value and a third function of a difference between said first threshold and said first base threshold value, when said first threshold is greater than a value obtained by applying said first function to a current positive one of said variations in engine speed.

16. A method as claimed in claim 14, in which said second threshold is updated as a sum of a second base threshold value and a fourth function of a difference between said second threshold and said second base threshold value, when said second threshold is greater in magnitude than a magnitude of a value obtained by applying said second function to a current negative one of said variations in engine speed.

17. A method as claimed in claim 15, in which said third function decays with time.

18. A method as claimed in claim 16, in which said fourth function decays with time.

19. An apparatus for signalling a road surface roughness over which a vehicle containing an internal combustion engine is travelling by processing internal combustion engine speed data, said apparatus comprising:

measuring means for measuring variations in speed of said internal combustion engine, analyzing means responsive to said measuring means for analyzing a distribution of said variations in speed to determine a width of the distribution, and action taking means responsive to said analyzing means for signalling a degree of surface roughness dependent on said distribution width.

* * * * *